Sept. 10, 1929.  S. R. PARRY, JR., ET AL  1,728,006
RUMBLE SEAT TOP
Filed Oct. 26, 1927   2 Sheets-Sheet 1

Inventors:
S. R. Parry, Jr.
J. E. Clark, Jr.
by their Attorneys

Sept. 10, 1929.  S. R. PARRY, JR., ET AL  1,728,006
RUMBLE SEAT TOP
Filed Oct. 26, 1927  2 Sheets-Sheet 2

Inventors
S. R. Parry, Jr.
J. E. Clark, Jr.
by their Attorneys
Baldwin & Wight

Patented Sept. 10, 1929.

1,728,006

UNITED STATES PATENT OFFICE.

SAM R. PARRY, JR., AND JOE E. CLARK, JR., OF CHATTANOOGA, TENNESSEE.

RUMBLE-SEAT TOP.

Application filed October 26, 1927. Serial No. 228,799.

It is common to employ rumble seats in connection with automobiles which are enclosed or have tops but the rumble seat itself is rarely provided with a top owing to the difficulty of doing this in a simple and efficient manner. The present invention relates to a top for the rumble seat which when not in use is compactly carried in the top of the automobile, which can be quickly moved to operative position whenever the rumble seat is in use. Details of the invention will be apparent from the following description and appended claims.

Figure 5:
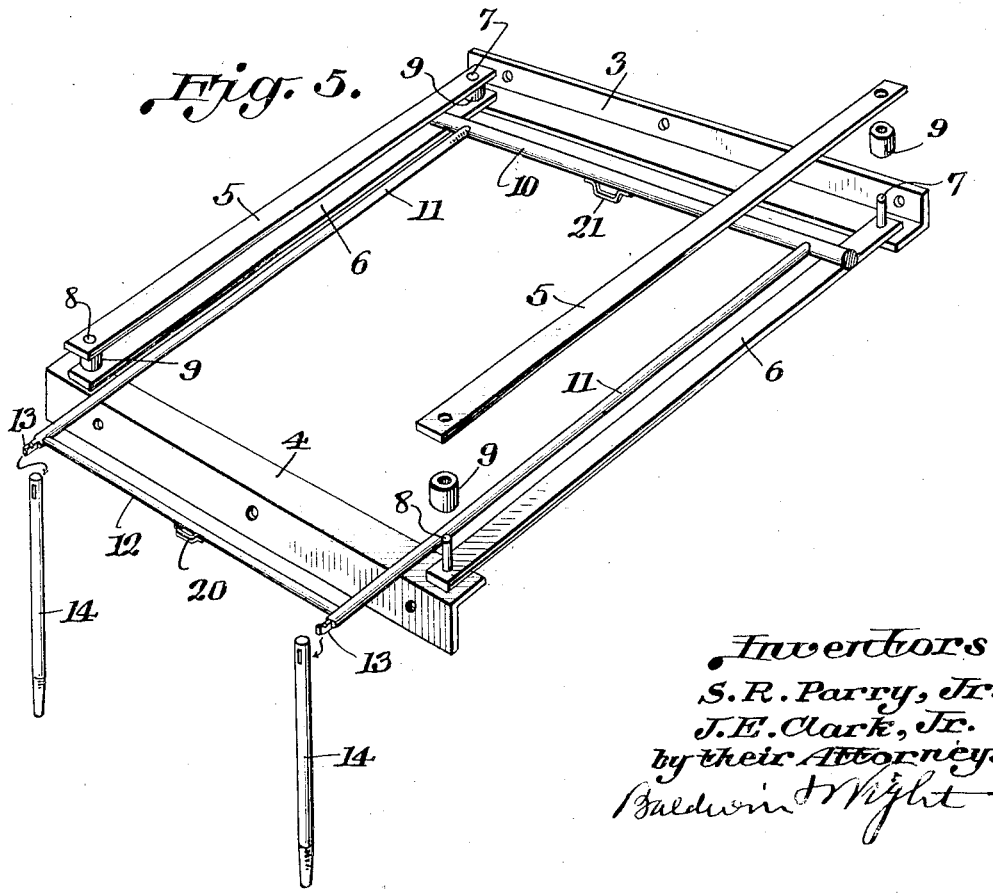
Figure 5 is a perspective view of the attachment with parts in disassembled position.

The type of automobile to which the invention is applied is relatively immaterial and accordingly there has been illustrated only a portion of the body A, the rumble seat B and the back C therefor in open position. To the frame members 1 and 2 of the automobile top are attached by screws or other equivalent fasteners angle irons 3 and 4 best shown in Figure 5. These angle irons are connected by upper members 5 and lower members 6, each of which is fastened at one end by bolts 8 to the angle iron 3 and at the other end by similar bolts 7 to provide a frame. Spacing members 9 surround the bolts and separate the members 5 and 6 sufficiently to form a passage or trackway.

A cross rod 10 has its ends projecting slightly to the outside of each of the pairs of members 5 and 6 and side or longitudinal rods 11 lying within the track members are connected to the rod 10 at one end in any suitable manner to form a frame. The other ends of the rods 11 are connected by a transverse member 12 and the extreme ends of the rods are connected at 13 by any suitable detachable or hinged connection to short standards 14 which are adapted to fit into blocks 15 carried by the back of the rumble seat and thus support the outer end of the top when it is in operative position.

A cover 16 of any desired material is attached at its inner end to the rod 10 and may be similarly fastened intermediate its ends to the transverse rod 12. It has a downwardly extending portion 17 provided with snap fasteners 18 which engage studs 19 on the back of the rumble seat. Other equivalent forms of fastening members may be employed if desired. The cross bar 12 may be provided with a handle 20 for convenience in pulling the attachment out into operative position or pushing it to its inoperative position within the top of the automobile proper. The cross bar 10 may be provided with a similar handle 21 on its under surface so that the top may be pulled into inoperative position from within the car proper. An opening as indicated is made in the rear of the car top to permit the passage of the attachment and this is normally closed by a member 22 provided with a finger piece or latch member 23.

Figure 1:
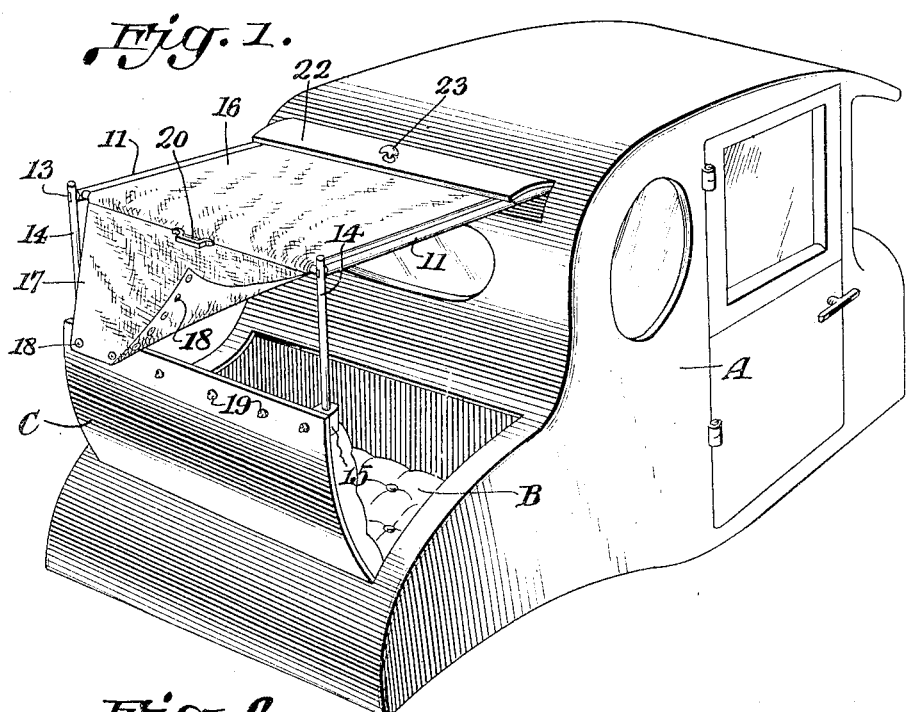
Figure 1 is a perspective view of a part of an automobile body showing a rumble seat with the invention applied thereto.
Figure 2:
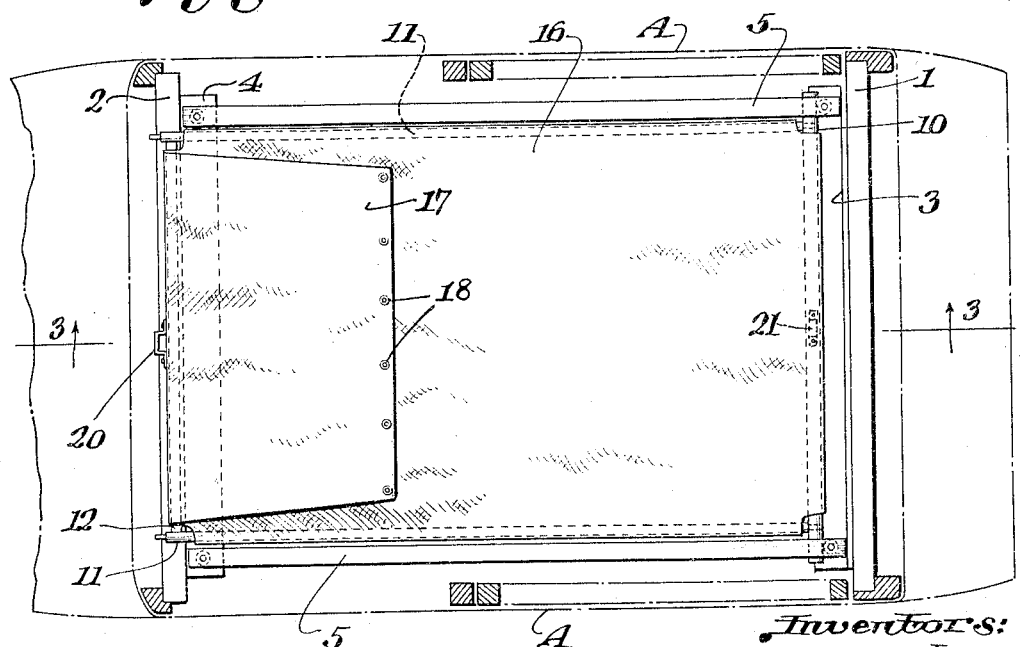
Figure 2 is a top plan view of the rumble seat top in operative position with the top of the automobile top removed.
Figure 3:
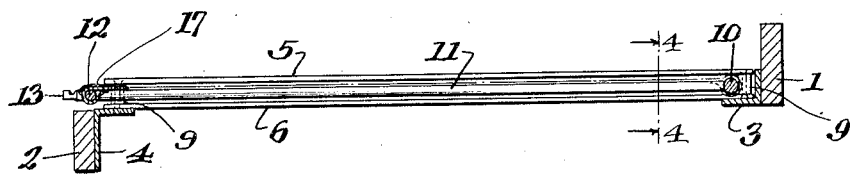
Figure 3 is a section on the line 3—3 of Figure 2.
Figure 4:
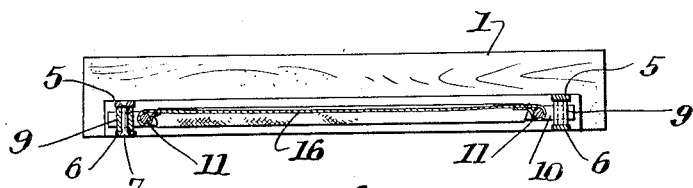
Figure 4 is a section on the line 4—4 of Figure 3.

When the cover or top is in inoperative position the back portion 17 lies upon the portion 16 as indicated in Figure 2. The standards 14 may be carried in any desired place and if these are hinged to the rods 11 they may be folded down parallel with said rods and moved back with the rest of the attachment into the top of the car. When it is desired to use the rumble seat top the cover 22 is raised and by means of the handle 20 the whole frame is drawn outwardly. The standards 14 are positioned in the block 15 and engaged with the outer ends of the rods 11. The part 17 of the cover is turned downwardly and fastened to the back of the rumble seat.

Obviously when it is desired to close the rumble seat the operation is reversed.

It will be apparent that the invention provides a simple and efficient mechanism which can be carried within the usual top of the car without interfering with any of the structure thereof and which can be quickly moved to and held in its operative position. Obviously various details may be modified without in any way departing from the spirit of the invention which is to be regarded as limited only by the scope of the appended claims.

We claim as our invention:

1. In a rumble seat top construction, a frame for attachment to a vehicle, means on said frame providing spaced trackways, a cover-supporting frame having cover-supporting means resting on the first frame and including side rods disposed inwardly of the trackways, and projections on the cover-supporting frame extending laterally beyond the side rods and slidably disposed in said trackways.

2. In a rumble seat top construction, a frame for attachment to a vehicle, upper and lower members at the sides of said frame providing trackways between them, a cover-supporting frame comprising a cross rod and side rods extending therefrom inwardly of the trackways, whereby the cross rod at its ends projects laterally beyond the side rods and said ends are mounted for movement in the trackways.

3. In a rumble seat top construction, a frame for attachment to a vehicle, said frame comprising cross members, upper and lower side members, spacing members between the upper and lower side members to provide trackways, fastening elements common to the cross members, side members and spacing members; a cover-supporting frame comprising side rods disposed inwardly of the side members supported on one of said cross members, and a cross rod from which the side rods extend, said cross rod extending outwardly beyond the side rods and having its ends slidably mounted in said trackways.

In testimony whereof, we have hereunto subscribed our names.

SAM R. PARRY, Jr.
JOE E. CLARK, Jr.